March 6, 1962 H. W. HAMMOND 3,023,418
EYE PROTECTOR
Filed June 20, 1960
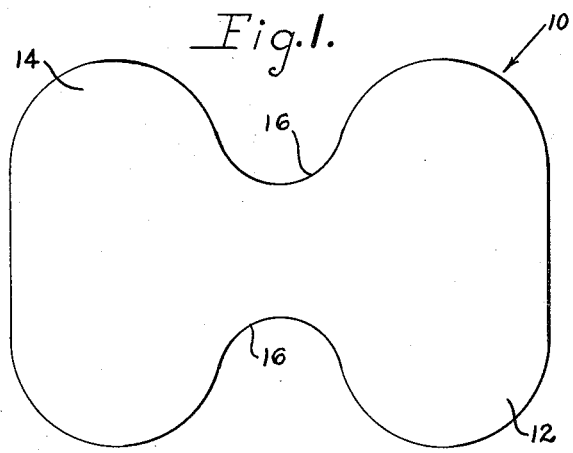
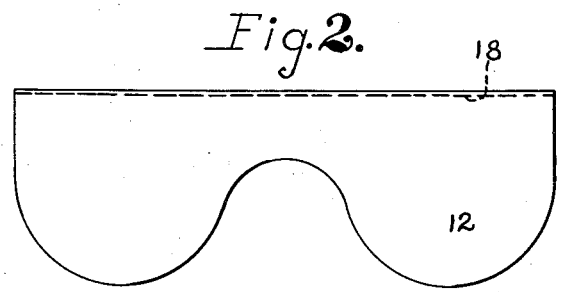
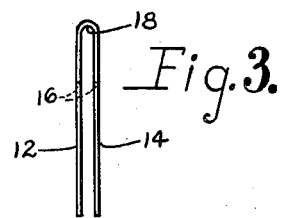
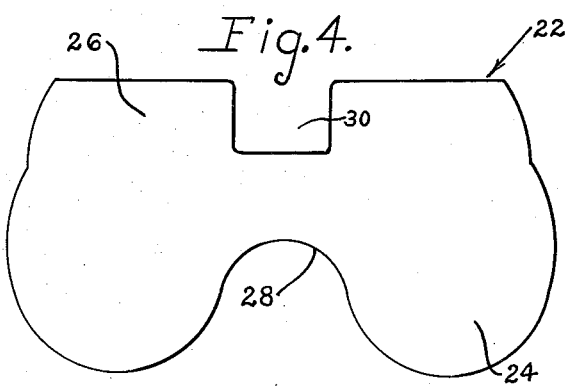
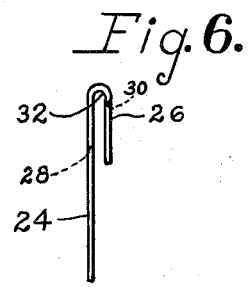
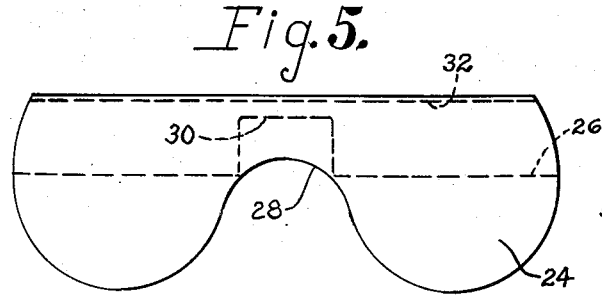
INVENTOR.
Harold W. Hammond
BY Harold E. Cole
Attorney

United States Patent Office 3,023,418
Patented Mar. 6, 1962

3,023,418
EYE PROTECTOR
Harold W. Hammond, 67 Hyslop Road, Brookline, Mass.
Filed June 20, 1960, Ser. No. 37,302
1 Claim. (Cl. 2—13)

This invention relates to an eye protector, particularly one that is attachable to spectacles.

One object of my invention is to provide an eye protector that is readily attachable and detachable from spectacles worn by the user, without requiring an extra part to effect attachment and detachment such as a cord or other accessory.

Another object is to provide such an eye protector that provides satisfactory vision, while giving protection from excessive brightness of the sun, auto headlights and the like, yet is inexpensive.

Still another object is to provide such an eye protector that provides protection from excessive light in varying degrees, the control of protection depending only upon a slight movement of the head, thus enabling a person to readily adjust to conditions he encounters even if those conditions change frequently as when driving an automobile at night.

The foregoing and other objects, which will appear as the nature of the invention is better understood, may be accomplished by a construction, combination and arrangement, such as is disclosed by the drawing. The nature of the invention is such as to render it susceptible to various changes and modifications, and, therefore, I am not to be limited to the construction disclosed by the drawing nor to the particular parts described in the specification; but am entitled to all such changes therefrom as fall within the scope of my claim.

In the drawing:

FIG. 1 is a plan view of a sheet of material used to form my eye protector.

FIG. 2 is a front elevational view of my eye protector ready to use.

FIG. 3 is an end elevational view thereof.

FIG. 4 is a plan view of a sheet of material used to form a modified form of my eye protector.

FIG. 5 is a front elevational view of said modified form of eye protector.

FIG. 6 is an end elevational view of said modified form of eye protector.

FIG. 7 is a perspective view showing my eye protector in position of use on spectacles worn by a person.

As illustrated, my eye protector is formed of a single sheet of material 10, such as plastic or other material that is translucent or optically clear. In other words it may be a well-known, tinted, transparent material. It has a front visual portion 12 and a rear visual portion 14 that are opposite each other, and each said portion has a cut-out 16, intermediate opposite sides, to accommodate the nose of the wearer. Said front and rear portions are joined by a loop portion 18 that spaces them apart as shown in said FIG. 3.

In FIGS. 4, 5 and 6 I show a modified form of eye protector in which I provide a single sheet of translucent material 22, such as plastic aforesaid, which has a front visual portion 24 and a rear retainer portion 26. Said front portion 24 has a cut-out 28 of considerable depth to accommodate a person's nose, and which extends, as shown, more than one-half the height (top to bottom in position of use) of said front portion 24 as shown in said FIGS. 5 and 6.

Said rear retainer portion 26, which is much less in height (top to bottom in position of use) than said front portion 24, has a cut-out 30 which preferably extends from the lower edge to the upper part of said rear portion 26. This cut-out 30 is in alinement with said cut-out 28. Said rear portion 26, as shown, extends downwardly slightly below the upper edge of said front portion cut-out 28. This rear portion 26 will serve as a vision shield if the user tips his head downwardly slightly, as when driving an auto in the strong glare of lights from an oncoming vehicle, or in any other situation where the eyes need extra protection from the glare of light.

In normal use, only said front portion 24 serves as a shield for the eyes. However, by said slight movement downwardly of a person's head said rear portion 26 also serves as a shield since it is thereby brought in the line of vision, thus providing additional protection, as when encountering light that is especially strong.

Either form of my eye protector is placed over spectacles when worn, as illustrated in said FIG. 7, with a said front portion 12 to 24, forward of the lenses in said spectacles, and a rear portion, 14 or 26, at the rear of said lenses. If one is driving an automobile, my protector may be placed within reach of the driver upon the shelf portion above the dash, where the driver can readily grasp it and place it on his spectacles. When traffic conditions no longer require its use, it can readily be removed and again placed on said shelf portion ready for instant use.

Said plastic sheet material may be obtained in various colors, and I have found that a pale yellow attains good results, as does a pale gray and a pale green, for instance.

What I claim is:

An eye protector comprising a tinted transparent front portion and an integral, tinted transparent rear portion that is of lesser height than said front portion in position of use, said rear portion being spaced from, and of approximately the same width as said front portion, each said portion having a cut-out therein intermediate opposite sides thereof, a loop portion integral with and connecting said front and rear portions, said rear portion cut-out extending higher than said front portion cut-out and terminating at a point adjacent said loop portion, said rear portion extending downwardly behind the front portion so as to provide double protection across the upper portion of the protector, said protector being of a width to extend across the lenses of a pair of spectacles.

References Cited in the file of this patent
UNITED STATES PATENTS

| | | |
|---|---|---|
| 1,640,661 | Rocco | Aug. 30, 1927 |
| 1,805,396 | Havens | May 12, 1931 |

FOREIGN PATENTS

| | | |
|---|---|---|
| 305,513 | Great Britain | Feb. 6, 1929 |
| 733,927 | Germany | Apr. 5, 1943 |
| 1,161,031 | France | Mar. 17, 1958 |